United States Patent
Yamaguchi et al.

(10) Patent No.: US 9,762,763 B2
(45) Date of Patent: Sep. 12, 2017

(54) IMAGE INSPECTION APPARATUS THAT DETERMINES A LINE WIDTH OF A TEST IMAGE, AND IMAGE FORMING APPARATUS

(71) Applicant: KONICA MINOLTA, INC., Chiyoda-ku, Tokyo (JP)

(72) Inventors: Toru Yamaguchi, Koganei (JP); Takahiro Kusunoki, Hino (JP); Takashi Harashima, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/091,743

(22) Filed: Apr. 6, 2016

(65) Prior Publication Data

US 2016/0301811 A1 Oct. 13, 2016

(30) Foreign Application Priority Data

Apr. 7, 2015 (JP) ................................ 2015-078721

(51) Int. Cl.
*H04N 1/04* (2006.01)
*H04N 1/00* (2006.01)
(Continued)

(52) U.S. Cl.
CPC ....... *H04N 1/0071* (2013.01); *H04N 1/00737* (2013.01); *H04N 1/00779* (2013.01);
(Continued)

(58) Field of Classification Search
CPC ............. H04N 1/0071; H04N 1/00779; H04N 1/00737; H04N 1/02815
(Continued)

(56) References Cited

U.S. PATENT DOCUMENTS

2015/0212019 A1* 7/2015 Shishido ................ G01B 15/04
250/307
2016/0301811 A1* 10/2016 Yamaguchi .......... H04N 1/0071

FOREIGN PATENT DOCUMENTS

JP 62-120585 A 6/1987
JP H09-096513 A 4/1997
(Continued)

OTHER PUBLICATIONS

Office Action (Notice of Reasons for Rejection) dated May 23, 2017, by the Japanese Patent Office in corresponding Japanese Patent Application No. 2015-078721, and an English Translation of the Office Action. (9 pages).

*Primary Examiner* — Houshang Safaipour
(74) *Attorney, Agent, or Firm* — Buchanan Ingersoll & Rooney PC

(57) ABSTRACT

An image inspection apparatus includes: a light source configured to emit white light onto a test image formed on a paper sheet; an optical lens system configured to receive light reflected by the paper sheet, the reflected light being of the white light emitted from the light source; a separating unit configured to separate light having passed through the optical lens system; a reading unit configured to receive the separated light at the different wavelengths, and optically read the test image of the light; and a control unit configured to calculate edge blurs at a rising edge and a falling edge of each set of image data of the light obtained by the reading unit reading the test image, calculate widths of the test image, and determine the width calculated from the set of image data having the smallest edge blur to be the width of the test image.

8 Claims, 16 Drawing Sheets

(51) Int. Cl.
*H04N 1/58* (2006.01)
*H04N 1/028* (2006.01)
*H04N 1/409* (2006.01)
*H04N 1/60* (2006.01)

(52) U.S. Cl.
CPC ....... *H04N 1/02815* (2013.01); *H04N 1/4092* (2013.01); *H04N 1/58* (2013.01); *H04N 1/605* (2013.01)

(58) Field of Classification Search
USPC ........................................ 358/3.27, 504, 518
See application file for complete search history.

(56) References Cited

FOREIGN PATENT DOCUMENTS

| | | |
|---|---|---|
| JP | 2002-040731 A | 2/2002 |
| JP | 2006-209208 A | 8/2006 |
| JP | 2009-140496 A | 6/2009 |

* cited by examiner

| FILTER | TRANSMISSION WAVELENGTH (nm) | FOCAL LENGTH DIFFERENCE (mm) | COLOR TO BE MEASURED |
|---|---|---|---|
| A | 410 | −1.3 | |
| B | 450 | −0.8 | YELLOW (Y) |
| C | 500 | −0.3 | |
| D | 530 | 0 | MAGENTA (M) |
| E | 600 | +0.5 | CYAN (C) |
| F | 750 | +1.2 | |

| FOCUS SHIFT (μm) | α |
|---|---|
| 0 TO 40 | 4.5 |
| 40 TO 100 | 4 |
| 100 OR MORE | 3.5 |

IMAGE INSPECTION APPARATUS THAT DETERMINES A LINE WIDTH OF A TEST IMAGE, AND IMAGE FORMING APPARATUS

The entire disclosure of Japanese Patent Application No. 2015-078721 filed on Apr. 7, 2015 including description, claims, drawings, and abstract are incorporated herein by reference in its entirety.

BACKGROUND OF THE INVENTION

Field of the Invention

The present invention relates to an image inspection apparatus that optically reads an image and determines the line width of the image, and an image forming apparatus that determines the line width of an image and sets an output for image writing in accordance with the line width.

Description of the Related Art

An apparatus that optically reads an image formed on a medium such as a paper sheet digitizes the read image or determines whether the formed image is correctly written. In view of this, techniques for correct image recognition have been suggested.

According to one of the suggested techniques, an apparatus that reads one- or two-dimensionally coded information such as a bar code determines whether there is a blur in a read image, and determines whether the distance from the apparatus to the object to be read falls within such a range as to perform appropriate reading (see JP 2006-209208 A, for example).

For an apparatus that reads bar codes, the following technique has been suggested. A bar code is formed with black lines and white lines that are alternately arranged, and the line widths of black lines and white lines are integral multiples of the smallest line width. Line width recognition is performed by taking advantage these characteristics, after the image is subjected to black/white determination with a predetermined threshold value (see JP 62-120585 A, for example).

In a process to determine the line width of a linear image from image data obtained by optically reading the image, the edges of the image are detected, and the distance between the edges is determined. In this manner, the line width is obtained. When the distance between the image to be read and the optical reading unit changes, the image data is blurred, and edges are not accurately detected from the image data. As a result, the obtained line width differs from the actual value.

For example, there is a technique by which an output for image writing is set, an image is set, and the line width of the formed image is determined. The relationship between the output for image writing and the line width of the formed image is then determined, so that an appropriate output for image writing for forming an image with a predetermined line width is set. By this technique, however, a correct output for image writing is not set unless the line width is correctly determined.

By any of the techniques disclosed in the prior art documents mentioned above, a correct line width is not obtained when the distance between the image to be read and the optical reading unit changes.

SUMMARY OF THE INVENTION

The present invention has been made to solve the above problem, and an object thereof is to provide an image inspection apparatus designed to correctly determine the width of an image, and an image forming apparatus that determines the width of an image and sets an output for image writing in accordance with the width.

To achieve the abovementioned object, according to an aspect, an image inspection apparatus reflecting one aspect of the present invention comprises: a light source configured to emit white light onto a test image formed on a paper sheet; an optical lens system configured to receive light reflected by the paper sheet, the reflected light being of the white light emitted from the light source; a separating unit configured to separate light having passed through the optical lens system in accordance with wavelength bands; a reading unit configured to receive the separated light at the different wavelengths, and optically read the test image of the light at each of the different wavelengths; and a control unit.

Further, the control unit is configured to calculate edge blurs at a rising edge and a falling edge of each set of image data of the light at the different wavelengths obtained by the reading unit reading the test image, calculate widths of the test image, and determine the width calculated from the set of image data having the smallest edge blur to be the width of the test image.

To achieve the abovementioned object, according to an aspect, an image inspection apparatus reflecting one aspect of the present invention comprises: a light source configured to emit white light onto a black test image and a color test image formed on a paper sheet; an optical lens system configured to receive light reflected by the paper sheet, the reflected light being of the white light emitted from the light source; a separating unit configured to separate light having passed through the optical lens system in accordance with wavelength bands; and a reading unit configured to receive the separated light at the different wavelengths, and optically read the test images of the light at each of the different wavelengths. Further, the image inspection apparatus comprises a control unit configured to calculate edge blurs at a rising edge and a falling edge of each set of image data of the light at the different wavelengths obtained by the reading unit reading the black test image, calculate edge blurs at a rising edge and a falling edge of each set of image data of the light at the different wavelengths obtained by the reading unit reading the color test image, and calculate widths of the test images.

Furthermore, the control unit determines a focal length difference between a focal length of the optical lens system with respect to light at a wavelength corresponding to the image data having the smallest edge blur in the black test image and a focal length of the optical lens system with respect to light at a wavelength corresponding to a color complementary to the color test image, and correct the calculated widths of the test images by using the edge blurs and the focal length difference.

To achieve the abovementioned object, according to an aspect, an image forming apparatus reflecting one aspect of the present invention comprises: an image forming unit configured to form an image on a paper sheet; and the image inspection apparatus according to the aspect of the present invention.

To achieve the abovementioned object, according to an aspect, an image forming apparatus reflecting one aspect of the present invention comprises: an image forming unit configured to form an image on a paper sheet; and the image inspection apparatus according to another aspect of the present invention.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1A:
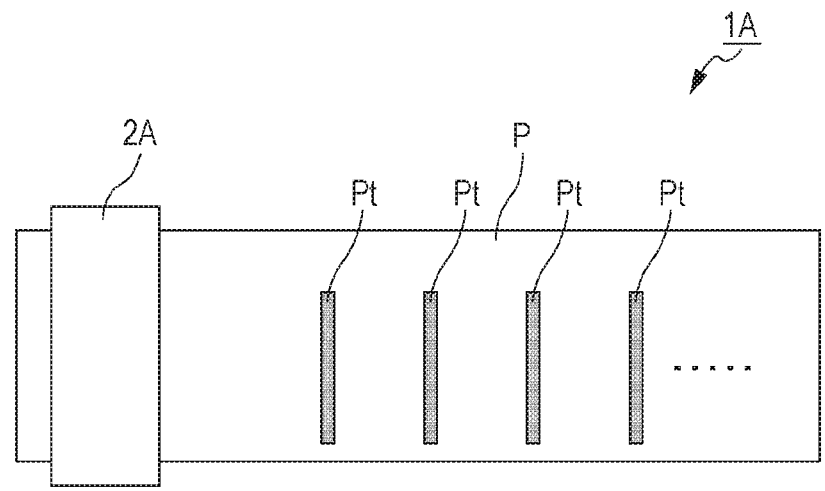
FIGS. 1A and 1B are diagrams showing an example structure of an image inspection apparatus.

Hereinafter, an embodiment of the present invention will be described in detail with reference to the drawings. However, the scope of the invention is not limited to the illustrated examples. In the description below and the respective drawings, like components or components having like functions are denoted by like reference numerals, and the same explanation will not be repeated.

1. Outline of an Image Inspection Apparatus

Referring first to FIGS. 1A to 6, the outline of an image inspection apparatus is described.

Figure 1B:
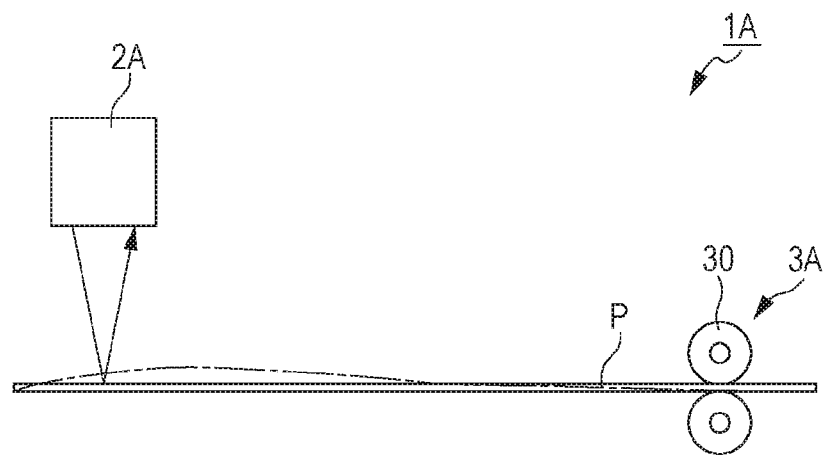
Figure 2:
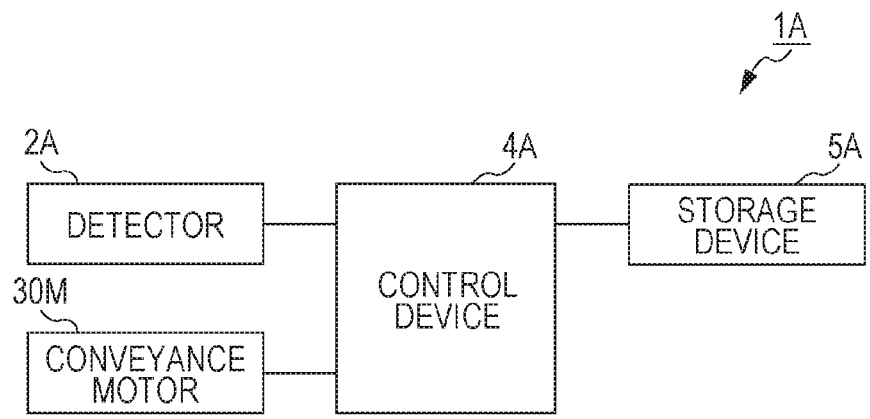
FIG. 2 is a functional block diagram showing an example functional structure of an image inspection apparatus according to a first embodiment of the present invention.

FIGS. 1A and 1B are diagrams showing an example structure of an image inspection apparatus. FIG. 1A is a plan view of the image inspection apparatus, seen from above. FIG. 1B is a side view of the image inspection apparatus. FIG. 2 is a functional block diagram showing an example functional structure of an image inspection apparatus according to a first embodiment of the present invention.

Figure 3:
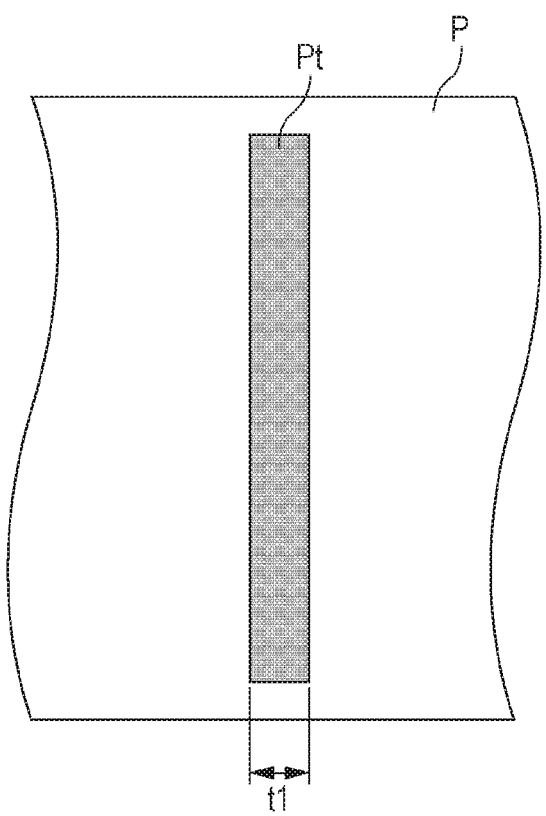
FIG. 3 is an explanatory diagram showing an example test image.
Figure 4A:
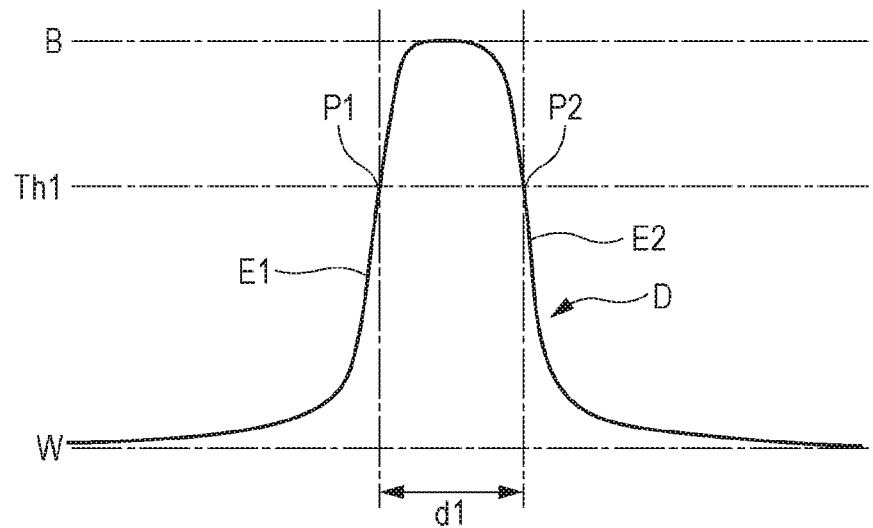
FIGS. 4A and 4B are graphs for explaining an example of image data (profile data) obtained by reading a test image.
Figure 4B:
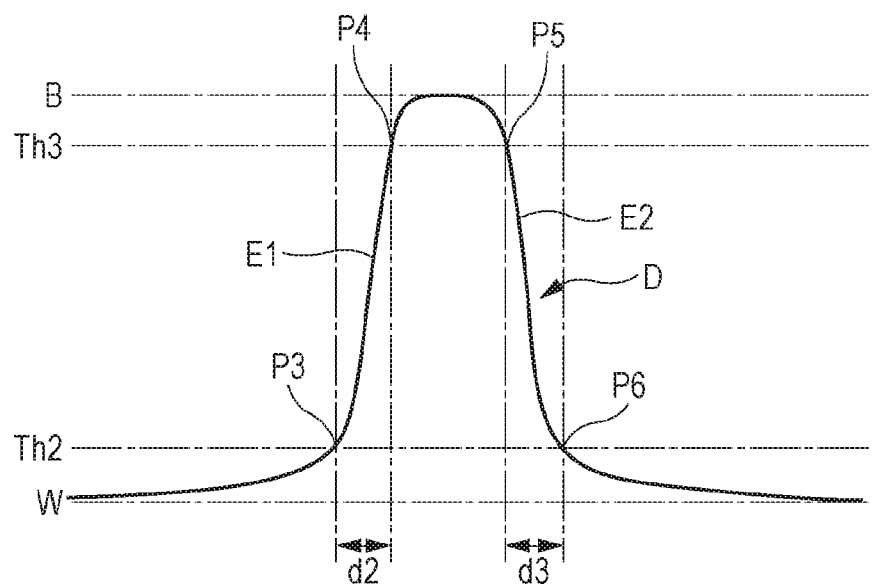
Figure 5:
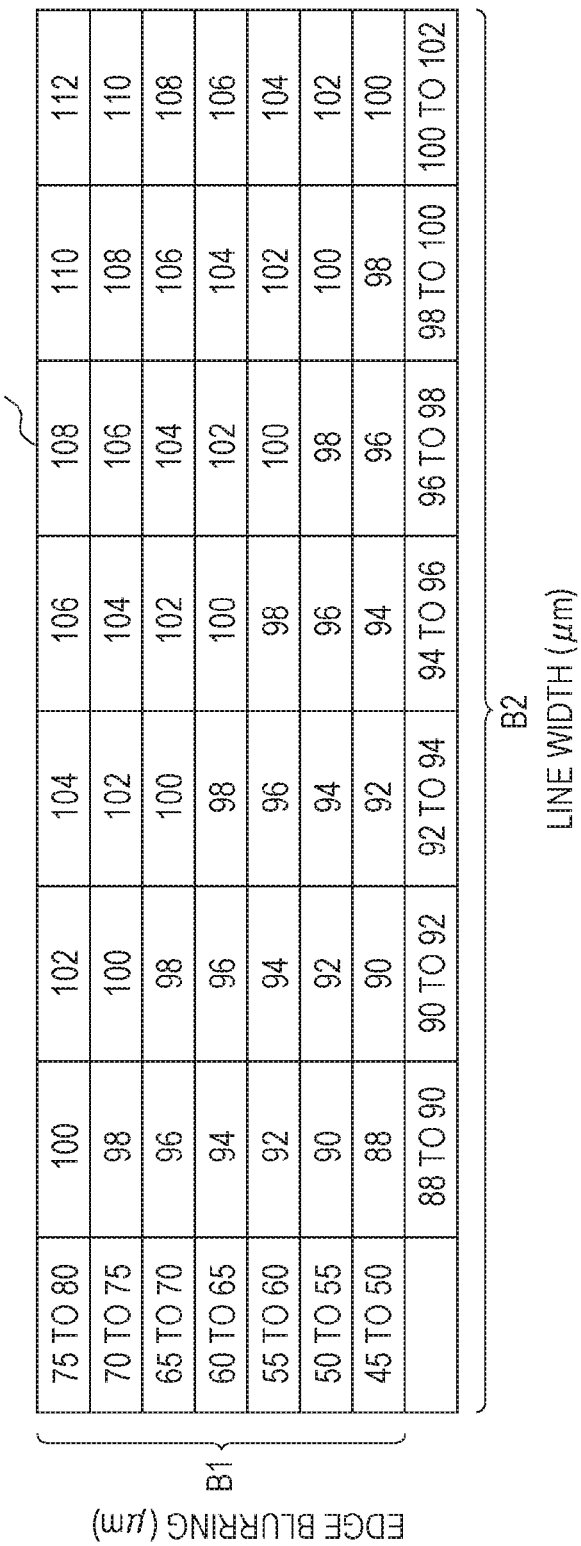
FIG. 5 is an explanatory diagram showing an example of a line width correction table.
Figure 6:
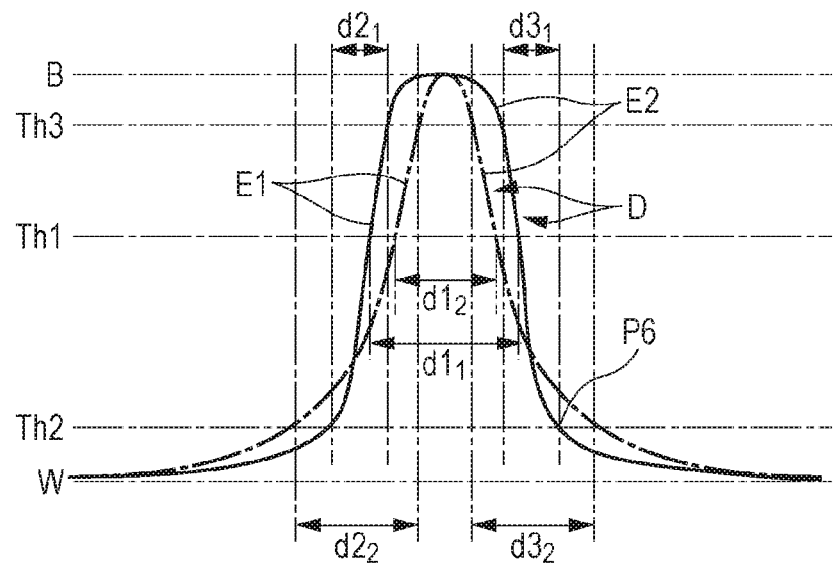
FIG. 6 is a graph for explaining an example of a relationship between edge blurring and a line width.

FIG. 3 is an explanatory diagram showing an example test image. FIGS. 4A and 4B are graphs for explaining an example of image data obtained by reading a test image. FIG. 4A is a graph for explaining line width. FIG. 4B is a graph for explaining an edge blur. FIG. 5 is an explanatory diagram showing an example of a line width correction table. FIG. 6 is a graph for explaining an example of a relationship between edge blurring and line width.

An image inspection apparatus 1A shown in FIGS. 1A and 1B reads a linear test image Pt formed as shown in FIG. 3 on a paper sheet P that is an example medium. The image inspection apparatus 1A then calculates the edge blur of the image data and the line width of the test image. Using the two values of the calculated edge blur and line width, the image inspection apparatus 1A refers to a line width correction table TB1 shown in FIG. 5, to obtain the corrected value of the line width. The image inspection apparatus 1A then determines the accurate line width of the test image Pt based on the edge blur.

The image inspection apparatus 1A includes a detector 2A that reads the test image Pt shown in FIG. 3, and a conveyance device 3A that conveys the paper sheet P on which the test image Pt is formed. The image inspection apparatus 1A further includes a control device 4A that determines the value of the line width of the test image Pt and the value of the edge blur indicating the definition of image data based on the image data obtained by the detector 2A reading the test image Pt, and a storage device 5A that stores the line width correction table and the like.

In this example, the detector 2A includes a light emitting element and a light receiving element (both not shown in the drawings). Light that is emitted from the light emitting element and is reflected by the paper sheet P is received by the light receiving element. In a case where the image formed on the paper sheet P is black, light reflectance differs between the image formation position called the black portion and the no-image position called the blank portion. The same applies in a case where the image is in a color (or is colored).

While the conveyance device 3A is conveying the paper sheet P, on which the linear test image Pt shown in FIG. 3 is formed, in a direction perpendicular to the test image Pt, the detector 2A reads the test image Pt. As a result, image data D is obtained. The image data D has such a signal waveform that the potential is at Hi level in the formation position of the test image Pt, which is the black portion B with low reflectance, and the potential is at Low level in the non-formation position of the test image Pt, which is the blank portion W with high reflectance, as shown in FIGS. 4A and 4B. In each of FIGS. 4A and 4B, the abscissa axis indicates elapsed time, and the ordinate axis indicates potential corresponding to reflectance. The image data D obtained as such a signal waveform is also called profile data.

The conveyance device 3A is an example of a conveying unit. The conveyance device 3A includes conveyance rollers 30 formed with a driving roller and a following roller that nip the paper sheet P, and a conveyance motor 30M that drives the conveyance rollers 30. Alternatively, the paper sheet P may not be moved but be fixed, and the detector 2A may be moved so that the test image Pt can be read through the relative movement of the paper sheet P and the detector 2A with respect to each other.

The control device 4A is an example of a control unit. The control device 4A determines the line width of the test image Pt from the image data D obtained by the detector 2A, and also determines an edge blur that will leads to an error in line width. To determine the line width of the test image Pt, the control device 4A calculates a line width detection threshold Th1 from the image data D obtained by the detector 2A. Where the potential in the blank portion W is 0%, and the peak potential in the black portion B is 100%, the line width detection threshold Th1 is 60% of the peak of the image data D in this example. However, the line width detection threshold Th1 is not limited to that value.

The line width t1 of the test image Pt shown in FIG. 3 is equal to the distance d1 between the two points of intersection between the image data D and the line width detection threshold Th1. In view of this, the control device 4A calculates the position of an intersection point P1 at which the image data D and the line width detection threshold Th1 intersect, and the position of the other intersection point P2. In FIGS. 4A and 4B, the abscissa axis indicates elapsed time. The distance d1 from the intersection point P1 to the intersection point P2 is determined by multiplying the relative velocity of the paper sheet P and the relative velocity of the detector 2A, or multiplying the conveyance velocity of the paper sheet P by the time required for conveyance from the intersection point P1 to the intersection point P2 in this example.

When the test image Pt is read by the detector 2A, deviation of the distance between the detector 2A and the paper sheet P from a predetermined reference position leads to a larger rising angle at the rising edge E1 at which the image data D rises from Low level to Hi level. This results in a lower definition of the image data. The same applies at the falling edge E2 at which the image data D falls from Hi level to Low level.

The line width t1 of the test image Pt is determined by the distance d1 between the two points of intersection between the image data D and the line width detection threshold Th1, as described above. Because of this, the inclinations of the rising edge E1 and the falling edge E2 of the image data D cause an error in the line width t1 of the test image Pt.

The inclination of the rising edge E1 is indicated by the distance between the two intersection points at which the image data D at the rising edge E1 intersects with two thresholds having different values. This distance is called an edge blur. The same applies at the falling edge E2.

To determine an edge blur, the control device 4A calculates a lower limit threshold Th2 and an upper limit threshold Th3 from the image data D obtained by the detector 2A. Although the lower limit threshold Th2 is 10% of the peak of the image data D, and the upper limit threshold Th3 is 90% of the peak of the image data D in this example, the values of the respective thresholds are not limited to them.

The control device 4A calculates an intersection point P3 at which the image data D and the lower limit threshold Th2 intersect, and an intersection point P4 at which the image data D and the upper limit threshold Th3 intersect at the rising edge E1. The distance d2 from the intersection point P3 to the intersection point P4 is determined as the edge blur at the rising edge E1 by multiplying the conveyance velocity of the paper sheet P by the time required for conveyance from the intersection point P3 to the intersection point P4.

The control device 4A also calculates an intersection point P5 at which the image data D and the upper limit threshold Th3 intersect, and an intersection point P6 at which the image data D and the lower limit threshold Th2 intersect at the falling edge E2. The distance d3 from the intersection point P5 to the intersection point P6 is determined as the edge blur at the falling edge E2 by multiplying the conveyance velocity of the paper sheet P by the time required for conveyance from the intersection point P5 to the intersection point P6. In this example, the mean value of the distance d2 and the distance d3, $d4(d4=(d2+d3)/2)$, is the value of the edge blur of the image data D.

The storage device 5A is an example of a storage unit. The storage device 5A stores the line width correction table TB1 shown in FIG. 5. The line width correction table TB1 is created based on experiment data in advance. For example, at least one test image Pt having its line width adjusted to the line width of the object to be inspected is read while the distance between the paper sheet P and the detector 2A is changed, and an edge blur d4 and the line width t1 are determined. The measured values of the edge blur and the line width are associated with the actual line width of the test image and are stored. In this manner, the line width correction table TB1 is created. With the line width correction table TB1, the actual line width is determined from combinations of measured values B1 of edge blurs and measured values B2 of line widths.

The control device 4A determines the edge blur d4 and the line width t1 from the image data D obtained by reading the test image Pt. By referring to the line width correction table TB1 using the measured values of the edge blur d4 and the line width t1, the control device 4A obtains the corrected line width value from the line width correction table TB1, and determines the actual line width t1 of the test image Pt.

Referring now to FIG. 6, an example operation of the image inspection apparatus 1A is described.

FIG. 6 is a graph for explaining a relationship between edge blurring and line width. As indicated by the dot-and-dash line in FIG. 1B, when the paper sheet P bends, for example, the distance between the detector 2A and the paper sheet P deviates from the reference position. The values of edge blurs $d2_2$ and $d3_2$ become greater than the values of edge blurs $d2_1$ and $d3_1$ observed in a case where the distance between the detector 2A and the paper sheet P is in the reference position, as shown in FIG. 6. The same applies to a result of calculation of the mean value between the edge blur on the side of the rising edge E1 and the edge blur on the side of the falling edge E2.

Meanwhile, a value $d1_2$ determined as the line width t1 is smaller than the original value $d1_1$ of the line width of the test image Pt. Because of this, a change in the distance between the detector 2A and the paper sheet P hinders accurate calculation of the line width of the test image Pt.

To counter this problem, the control device 4A obtains the image data D from the detector 2A, which has read one test image Pt (FIG. 1A) having a constant line width in the sub scan direction parallel to the direction of relative movement of the paper sheet P and the detector 2A. The control device 4A then determines the edge blur d4 and the line width t1 from the image data D. By referring to the line width correction table TB1 using the measured values of the edge blur d4 and the line width t1, the control device 4A obtains the corrected line width value from the line width correction table TB1, and determines the actual line width t1 of the test image Pt.

Alternatively, the control device 4A obtains the image data D from the detector 2A, which has read test images Pt (FIG. 1A) each having a constant line width in the sub scan direction parallel to the direction of relative movement of the paper sheet P and the detector 2A. The control device 4A then determines the edge blur d4 and the line widths t1 from the respective sets of image data D. By referring to the line width correction table TB1 using the measured values of the edge blur d4 and the line widths t1, the control device 4A obtains the corrected line width values from the line width correction table TB1, and determines the actual line widths t1 of the respective test images Pt. If the actual line widths t1 of the respective test images Pt are the same, the control device 4A determines that a correct line width has been acquired.

In the above described example, the line width of the test image Pt is determined by using the line width correction table TB1. However, such a conversion equation that the same results as those with the line width correction table TB1 can be obtained is created beforehand based on experiment data or the like, and measured values of the edge blur d4 and the line width t1 may be converted into values indicating the actual line width according to the conversion equation.

However, the line widths in the line width correction table TB1 are referred to in accordance with the correlation between the line width and the edge blur determined from the image data, and therefore, the edge blur at an appropriate focal length needs to be measured in advance. In other words, if the edge blur of the image data changes as the current toner or transfer state differs from that at the time when the line width correction table TB1 was created, a correct line width measurement result is not to be obtained.

In view of this, the inventors further repeated experiments, and attained a method of correctly detecting the width of an image formed on a paper sheet without the use of such a line width correction table and without depending on the optical distance between the paper sheet and the detector.

2. First Embodiment

An image inspection apparatus and an image forming apparatus according to a first embodiment of the present invention are described.

[Image Inspection Apparatus]

The image inspection apparatus according to the first embodiment of the present invention is first described, with reference to FIGS. 7 to 10.

Figure 7:
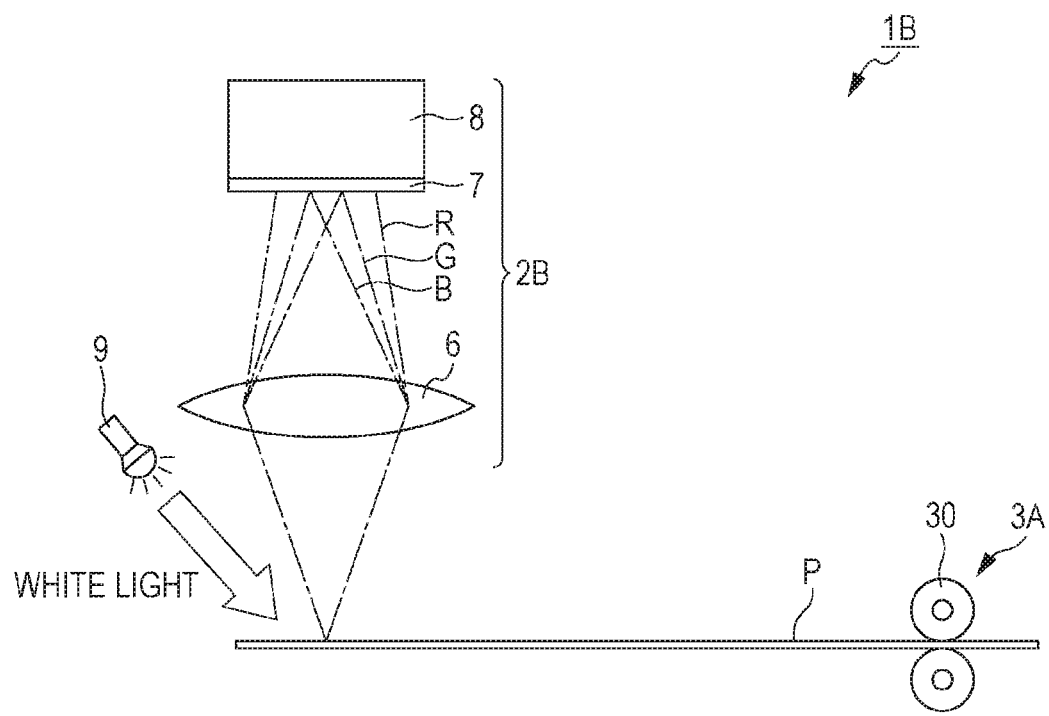
FIG. 7 is a diagram showing an example structure of an image inspection apparatus according to a first embodiment of the present invention.

FIG. 7 is a diagram showing an example structure of the image inspection apparatus according to the first embodiment of the present invention.

The image inspection apparatus 1B shown in FIG. 7 includes a detector 2B. The detector 2B includes an optical lens 6, a separating unit 7, a light receiving element 8, and a light emitting element 9. The other aspects of the structure of the image inspection apparatus 1B are the same as those of the image inspection apparatus 1A shown in FIG. 2.

The light emitting element 9 is an example of a light source, and emits white light onto a test image formed on a paper sheet P being conveyed.

The optical lens 6 is an example of an optical lens system. The optical lens 6 receives white light that has been emitted from the light emitting element 9 and been reflected by the paper sheet P, and gathers the light onto the light receiving element 8. A lens having large axial chromatic aberration is used as the optical lens 6. Axial chromatic aberration is characteristics with which the focal length varies with the respective wavelengths of light (such as light in red (R), green (G), and blue (B)), even when the same lens is used. However, the optical lens 6 may be in various forms, such as a convex lens, a lens other than a convex lens, and a combination of a convex lens and another lens.

The separating unit 7 is located on the front surface side of the light receiving element 8, and separates the light that has passed through the optical lens 6 by the wavelength (color). For example, color filters capable of separating colors from one another can be used as the separating unit 7.

The light receiving element 8 is an example of a reading unit. The light receiving element 8 receives light of different wavelengths separated by the separating unit 7, and optically reads the test image from the light of the respective wavelengths. An optical sensor having photoelectric conversion elements arranged in the main scan direction and the sub scan direction (sheet conveyance direction) perpendicular to the main scan direction to form an array is used as the light receiving element 8.

Figure 8A:
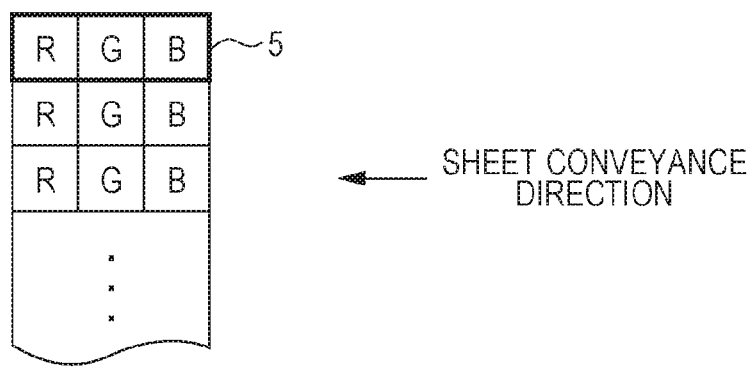
FIGS. 8A and 8B are explanatory diagrams showing examples of color filters to be used in a separating unit.
Figure 8B:
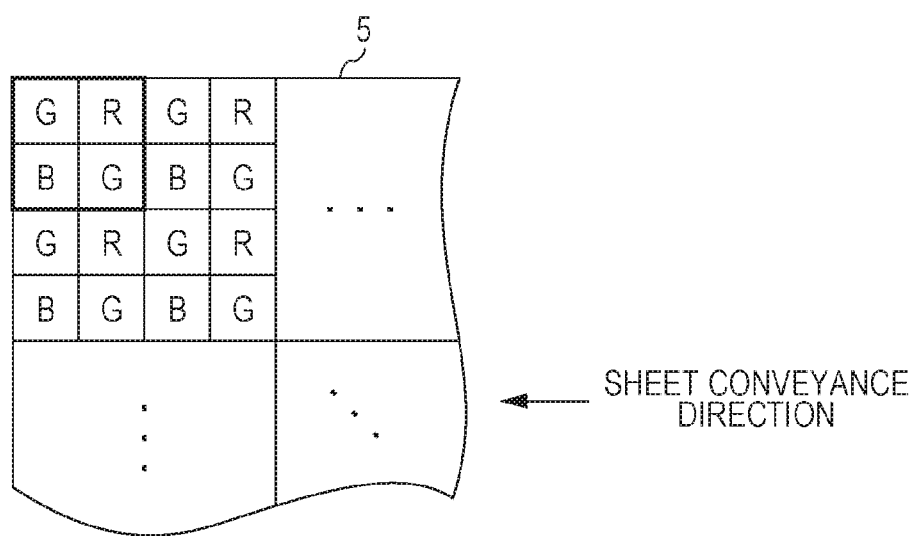

FIGS. 8A and 8B are explanatory diagrams showing examples of color filters to be used as the separating unit 7. FIG. 8A shows a first example of color arrangement of the color filters. FIG. 8B shows a second example of color arrangement of the color filters.

The separating unit 7 shown in FIG. 8A includes filters of red (R), green (G), and blue (B) in this order in the direction from the downstream side toward the upstream side of the sheet conveyance direction. Sets of these RGB filters are arranged in the main scan direction. Each R filter extracts primarily the light in the red wavelength band from white light. Each G filter extracts primarily the light in the green wavelength band from white light. Each B filter extracts primarily the light in the blue wavelength band from white light.

The separating unit 7 shown in FIG. 8B includes 2×2 filters formed with R, G, G, and B filters, and sets of these RGGB 2×2 filters are arranged in the main scan direction. In FIG. 8B, sets of RGGB filters are also arranged in the sub scan direction. At least one R filter, one G filter, and one B filter should be included in the sheet conveyance direction. That is, the second and later sets of RGGB filters can be used for backup. In the examples shown in FIGS. 8A and 8B, filters corresponding to the three colors of RGB are shown. However, the types of filters may correspond to two colors, or may correspond to four or more colors.

Using the optical lens 6 having large axial chromatic aberration and the light receiving element 8 to which the separating unit 7 including filters is attached, the image inspection apparatus 1B obtains the image data of a test image with light in more than one color, and measures line widths and edge blurs at the same time. In accordance with the values of the line widths and the edge blurs measured in the colors, or the values the line widths and the edge blurs measured while the focal length is changed, the image inspection apparatus 1B regards the line width (of the image data obtained with the filter) in the most focused state as the line width of the test image. The line width in the most focused state is measured from the image data of the sensor system (the filters of the separating unit 7 and the light receiving element 8) having the smallest edge blur among the measurement results. Thus, the line width (the length in the sub scan direction) of the test image can be accurately measured.

Figure 9:
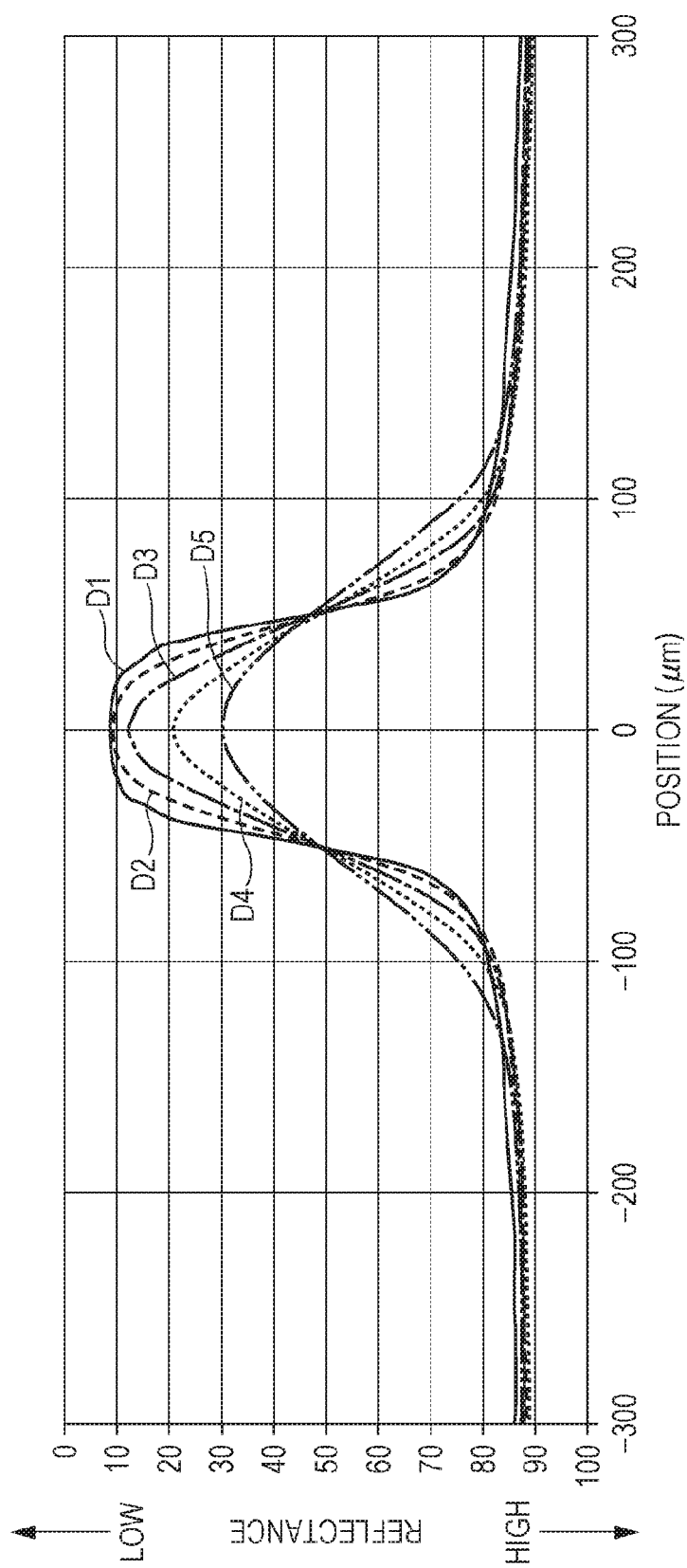
FIG. 9 is a graph for explaining an example of sets of image data (profile data) obtained by reading test images.

FIG. 9 is a graph for explaining an example of sets of image data (profile data) obtained by reading test images.

In the example shown in FIG. 9, image data D1 to D5 are obtained by using the separating unit 7 having color filters formed with filters corresponding to five colors. In FIG. 9, the abscissa axis indicates the position (distance) [μm] calculated from elapsed time, and the ordinate axis indicates the reflectance [%] calculated from potential.

Figure 10:
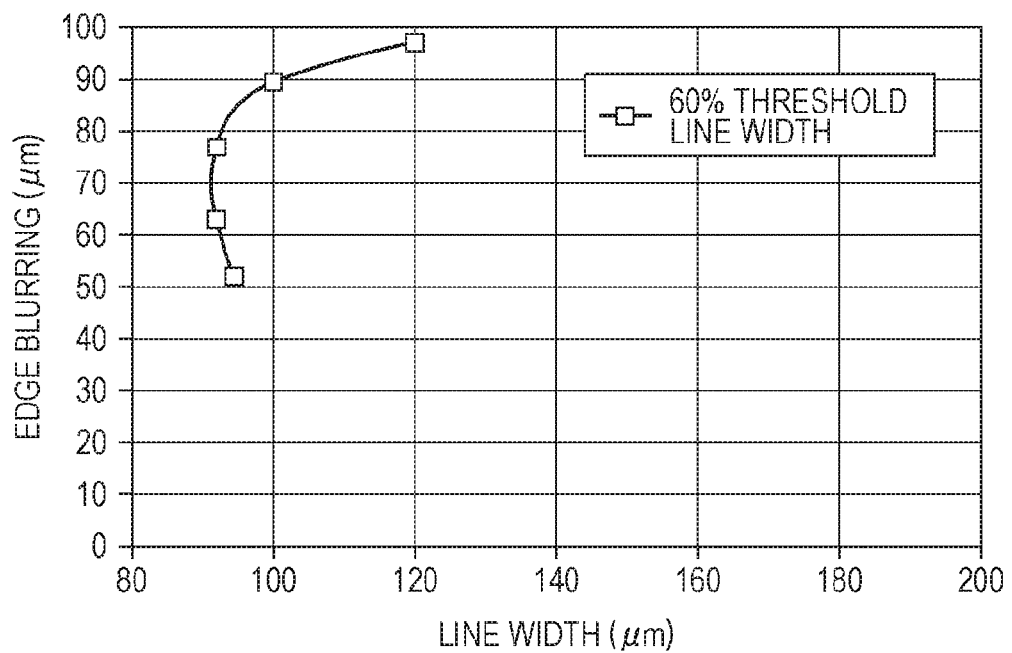
FIG. 10 is a graph showing an example of a relationship between line width and edge blurring.

FIG. 10 is a graph showing an example of a relationship between line width and edge blurring.

FIG. 10 is a graph in which the line widths and the edge blurs determined for the image data D1 to D5 obtained with the filters corresponding to the respective colors are plotted. In FIG. 10, the abscissa axis indicates line width (μm), and the ordinate axis indicates edge blurring (μm). Among the measurement points plotted in this graph, the measurement point having the smallest edge blur is the measurement point calculated from the image data obtained with the filter closest to the focal position of the separating unit 7. In view of this, the control device 4A regards the line width of the image data having the smallest edge blur as the correct line width of the test image. In the example case shown in FIG. 10, the correct line width of the test image is determined to be approximately 95 μm, which is the value of the line width when the edge blur is approximately 52 μm.

[Image Forming Apparatus]

The image forming apparatus according to the first embodiment of the present invention is now described, with reference to FIGS. 11 to 14.

(Structure of the Control System of the Image Forming Apparatus)

Figure 11:
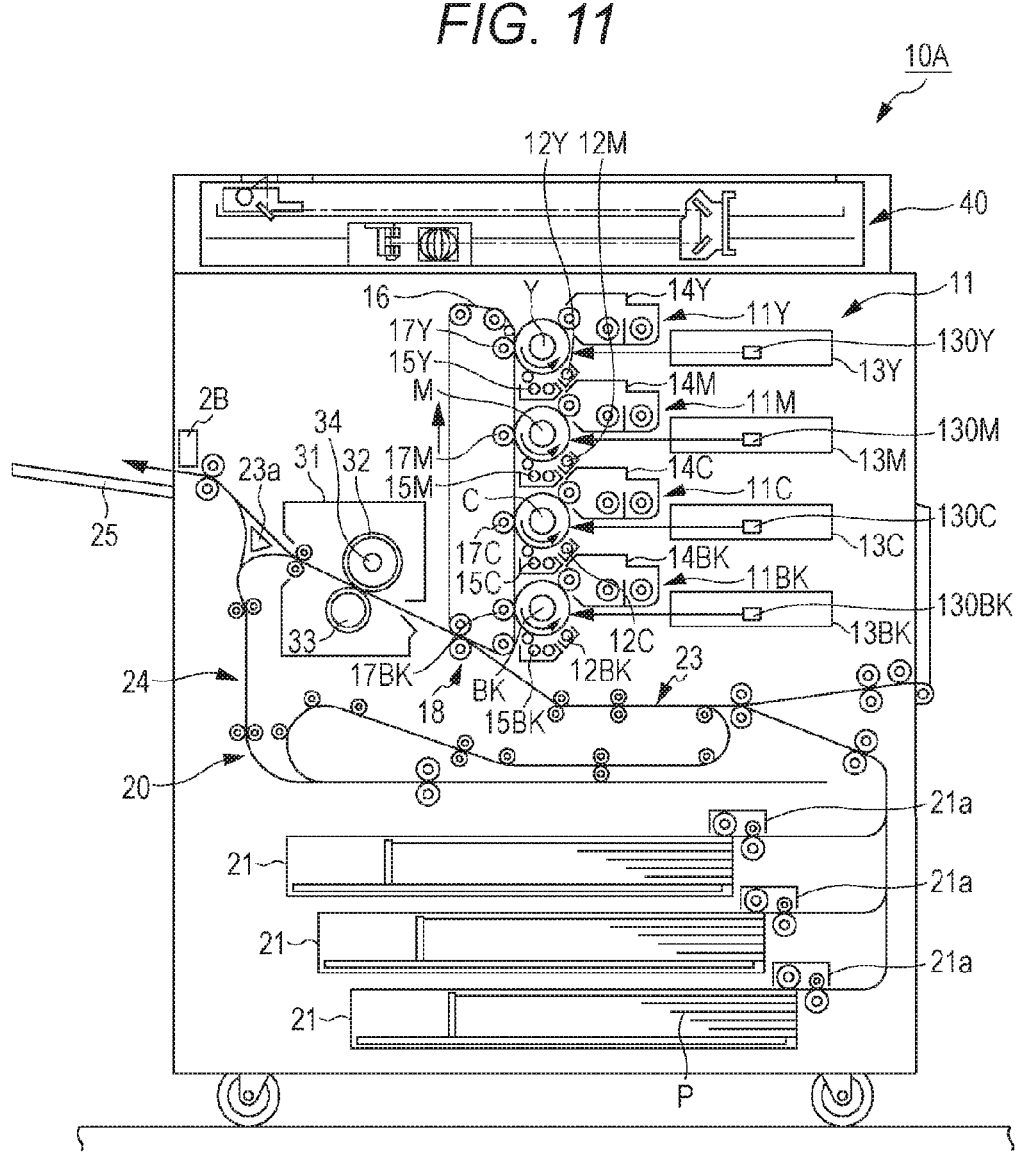
FIG. 11 is a diagram showing an example entire structure of an image forming apparatus according to the first embodiment of the present invention.

FIG. 11 is a diagram showing an example entire structure of the image forming apparatus according to the first embodiment of the present invention. This block diagram shows the components considered necessary in the description of the present invention or related components, and image forming apparatuses are not limited to this example.

The image forming apparatus 10A of this embodiment sets a light quantity for a laser diode serving as the writing unit based on a line width determined by reading a test image. If the line width of the test image is not correctly determined, an appropriate light quantity cannot be set for the laser diode in this case. In view of this, the image inspection apparatus 1A including the above described detector 2B is used so that the line width of a test image can be accurately determined.

First, the entire structure of the image forming apparatus 10A is described. The image forming apparatus 10A is an electrophotographic image forming apparatus such as a copying machine. In this example, photosensitive members are arranged in the vertical direction to face a single intermediate transfer belt. Having this structure, the image forming apparatus 10A is a so-called tandem color image forming apparatus that forms a full-color image.

The image forming apparatus 10A includes an image forming unit 11, a sheet conveying unit 20, a fixing unit 31, the detector 2B, and a document reading unit 40.

The image forming unit 11 is an example of an image forming unit. The image forming unit 11 includes an image forming unit 11Y that forms an image in yellow (Y), an image forming unit 11M that forms an image in magenta (M), an image forming unit 11C that forms an image in cyan (C), and an image forming unit 11BK that forms an image in black (BK).

The image forming unit 11Y includes a photosensitive drum Y, and a charging unit 12Y, an optical writing unit 13Y including a laser diode 130Y, a development device 14Y, and a drum cleaner 15Y, which are provided around the photosensitive drum Y. Likewise, the image forming units 11M, 11C, and 11BK include photosensitive drums M, C, and BK, charging units 12M, 12C, and 12BK, optical writing units 13M, 13C, and 13BK including laser diodes 130M, 130C, and 130BK, development devices 14M, 14C, and 14BK, and drum cleaners 15M, 15C, and 15BK, which are provided around the respective photosensitive drums M, C, and BK.

The surface of the photosensitive drum Y is uniformly charged by the charging unit 12Y. A latent image is formed on the photosensitive drum Y through scan exposure performed by the laser diode 130Y of the optical writing unit 13Y. The development device 14Y then visualizes the latent image on the photosensitive drum Y by developing the latent image with toner. Consequently, an image (a toner image) in a predetermined color corresponding to yellow is formed on the photosensitive drum Y.

Likewise, the surface of the photosensitive drum M is uniformly charged by the charging unit 12M. A latent image is formed on the photosensitive drum M through scan exposure performed by the laser diode 130M of the optical writing unit 13M. The development device 14M then visualizes the latent image on the photosensitive drum M by developing the latent image with toner. Consequently, a toner image in a predetermined color corresponding to magenta is formed on the photosensitive drum M.

The surface of the photosensitive drum C is uniformly charged by the charging unit 12C. A latent image is formed on the photosensitive drum C through scan exposure performed by the laser diode 130C of the optical writing unit 13C. The development device 14C then visualizes the latent image on the photosensitive drum C by developing the latent image with toner. Consequently, a toner image in a predetermined color corresponding to cyan is formed on the photosensitive drum C.

The surface of the photosensitive drum BK is uniformly charged by the charging unit 12BK. A latent image is formed on the photosensitive drum BK through scan exposure performed by the laser diode 130BK of the optical writing unit 13BK. The development device 14BK then visualizes the latent image on the photosensitive drum BK by developing the latent image with toner. Consequently, a toner image in a predetermined color corresponding to black is formed on the photosensitive drum BK.

Primary transfer rollers 17Y, 17M, 17C, and 17BK sequentially transfer the toner images formed on the photosensitive drums Y, M, C, and BK, onto a predetermined position on an intermediate transfer belt 16 serving as a belt-like intermediate transferrer. A secondary transfer unit 18 then transfers the toner images in the respective colors on the intermediate transfer belt 16 onto a paper sheet P being transferred at a predetermined time by the sheet conveying unit 20.

The sheet conveying unit 20 includes sheet feeder trays 21 in which paper sheets P are stored in this example, and sheet feeding units 21a that supply the paper sheets P stored in the sheet feeder trays 21. The sheet conveying unit 20 also includes a main conveyance path 23 in which a paper sheet P supplied from a sheet feeder tray 21 is conveyed, a reverse conveyance path 24 that reverses the paper sheet P, and a discharge tray 25 onto which the paper sheet P is discharged.

In the sheet conveying unit 20, the reverse conveyance path 24 branches from the main conveyance path 23 on the downstream side of the fixing unit 31. The sheet conveying unit 20 includes a switching gate 23a at the branch point between the main conveyance path 23 and the reverse conveyance path 24. In the image forming apparatus 10A, an image is formed on the upper surface of the paper sheet P that has been conveyed in the main conveyance path 23 and has passed through the secondary transfer unit 18 and the fixing unit 31. If images are to be formed on both surfaces of the paper sheet P, the paper sheet P having the image formed on the surface facing upward is conveyed from the main conveyance path 23 to the reverse conveyance path 24, and is then conveyed from the reverse conveyance path 24 to the main conveyance path 23, so that the image formation surface faces downward. In this manner, the paper sheet P is reversed, and an image can be formed on the other surface facing upward.

The fixing unit 31 is an example of a fixing unit. The fixing unit 31 performs a fixing process to fix an image onto the paper sheet P onto which the image has been transferred. The fixing unit 31 not only conveys the paper sheet P but also performs pressure fixing with a pair of fixing rollers 32 and 33 and heat fixing with a fixing heater 34. By doing so, the fixing unit 31 fixes the image to the paper sheet P.

The document reading unit 40 performs scan exposure on an image of a document with the optical system of a scan exposure device, and obtains an image signal by reading the reflected light with a line image sensor. The image forming apparatus 10A may further include an automatic document conveyance device (not shown) that conveys documents at an upper portion.

The detector 2B reads a predetermined test image from the paper sheet P onto which an image has been transferred by the secondary transfer unit 18 and been fixed by the fixing unit 31. In view of this, the detector 2B is provided in the main conveyance path 23 that is located on the downstream side of the branch point between the main conveyance path 23 and the reverse conveyance path 24, and is located on the upstream side of the discharge tray 25 in this example. The detector 2B may be an inline sensor that detects color information and reflectance information about an image formed by the image forming unit 11. Alternatively, the detector 2B may be an optical sensor that detects reflectance information about an image formed by the image forming unit 11.

Figure 12:
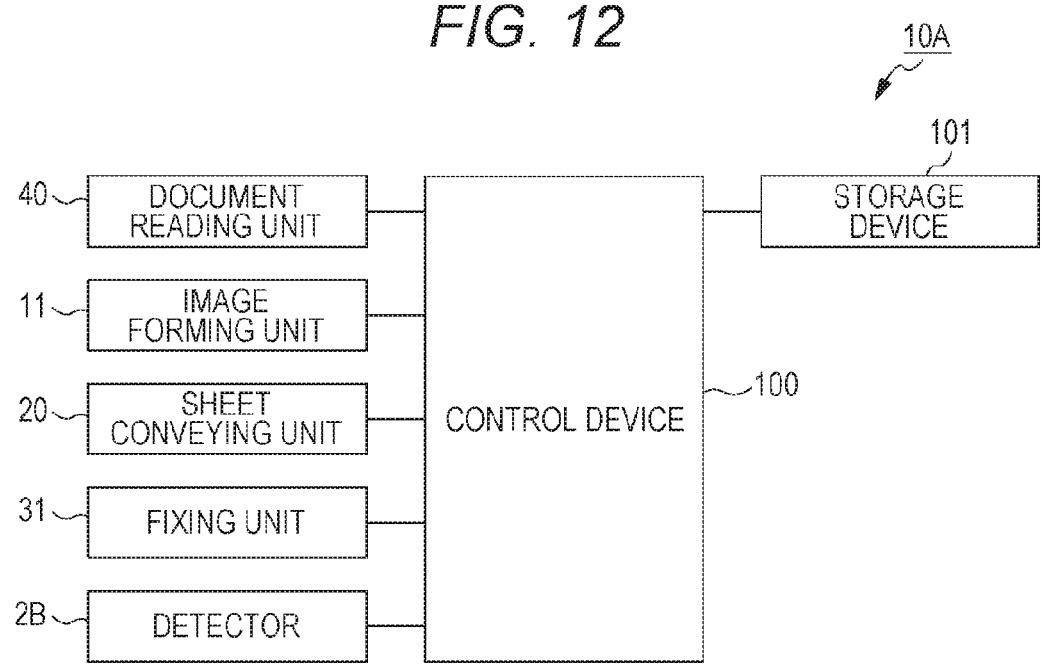
FIG. 12 is a functional block diagram showing an example functional structure of the image forming apparatus according to the first embodiment of the present invention.

FIG. 12 is a functional block diagram showing an example functional structure of the image forming apparatus 10A according to the first embodiment of the present invention.

Referring to FIG. 12, control functions will be described below. The control functions relate to an operation to write a test image, an operation to determine a line width and an edge blur by reading the test image, and an operation to set a light quantity for the laser diode in accordance with the line width determined by reading the test image.

The image forming apparatus 10A includes a control device 100 that performs a series of control operations to supply a paper sheet P, form an image, and discharge the paper sheet P, and a storage device 101 that stores a line width correction table or the like. The control device 100 is an example of a control unit. The control device 100 includes a CPU, a microprocessor called an MPU, and memories such as a RAM and a ROM. The program to be executed by the CPU or the MPU of the control device 100 is stored in the ROM or the storage device 101.

In a regular operation to be performed by the image forming apparatus 10A to form an image on a paper sheet P, the control device 100 controls the sheet conveying unit 20 to convey a paper sheet P. The control device 100 controls the image forming unit 11 to form an image on the paper sheet P based on image data obtained by the document reading unit 40 from a document, or image data acquired from outside. The control device 100 also controls the fixing unit 31 to fix the image onto the paper sheet P, and discharge the paper sheet P having the image formed thereon.

Figure 13:
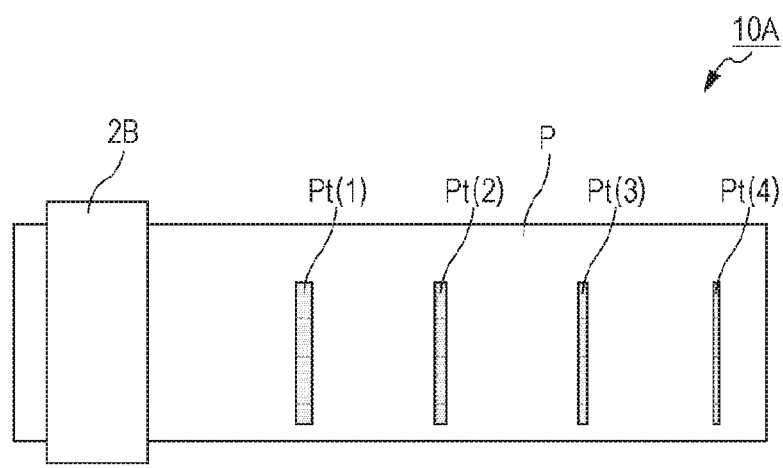
FIG. 13 is an explanatory diagram showing an example test image.

FIG. 13 is a diagram for explaining an example test image.

The line width of a test image Pt is determined by the light quantity of the laser diode at the time when the test image Pt is formed. In an operation to set light quantities for the laser diodes 130Y, 130M, 130C, and 130BK, the control device 100 controls the light quantities of the laser diodes 130Y, 130M, 130C, and 130BK to differ from one another, and test images Pt are formed on a paper sheet P. In this example, four test images Pt(1) to Pt(4) have different line widths from one another, since the light quantities of the laser diodes 130Y, 130M, 130C, and 130BK differ from one another. As the test images Pt(1) to Pt(4) having different line widths from one another are formed on a paper sheet, the time required for inspecting the line widths and controlling the line widths can be shortened.

The storage device 101 is an example of a storage unit. The storage device 101 stores the data to be used by the CPU or the MPU of the control device 100 to execute a program, or the data obtained as a result of execution of a program. For example, the storage device 101 stores the measurement results shown in FIGS. 9 and 10, and the data shown in FIGS. 16 and 17, which will be described later.

The control device 100 conveys the paper sheet P having the test images Pt formed and fixed thereon to the detector 2B. The detector 2B then reads the test images Pt. From the image data D obtained by the detector 2B reading the test images Pt, the control device 100 determines the line widths and the edge blurs of the respective test images Pt. The control device 100 determines the actual line width t1 of each test image Pt, using the line width having the smallest edge burr among the edge blurs and the line widths (see FIG. 10, for example) calculated from the image data (see FIG. 9, for example) of the respective filters (colors). The control device 100 then sets the light quantities or fogging voltages or the like of the laser diodes 130Y, 130M, 130C, and 130BK at such values with which predetermined line width values are obtained.

(First Example Operation of the Image Forming Apparatus)

Figure 14:
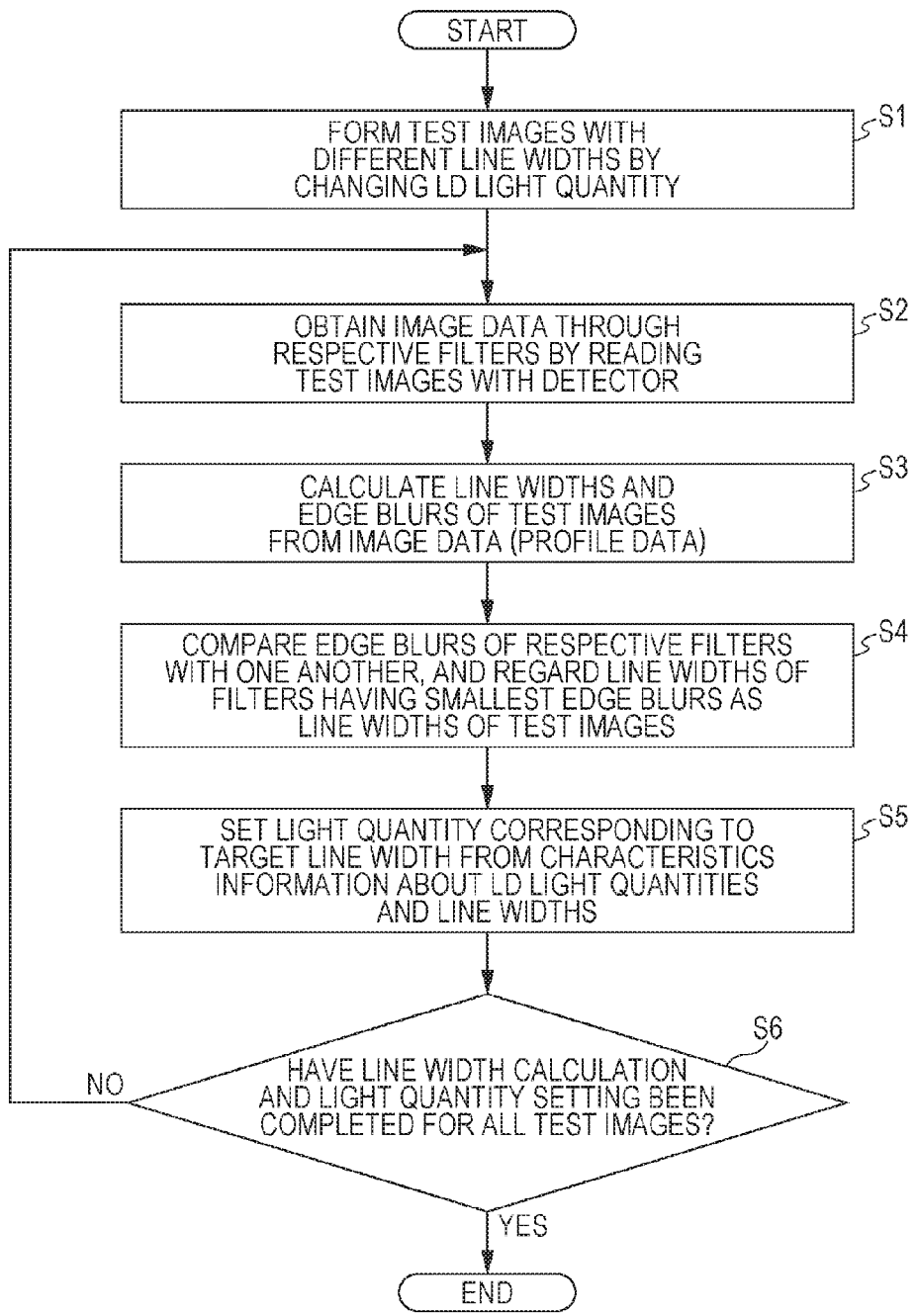
FIG. 14 is a flowchart showing the sequence of the procedures in an example operation of the image forming apparatus according to the first embodiment of the present invention.

FIG. 14 is a flowchart showing the sequence of the procedures in a first example operation of the image forming apparatus 10A. The control device 100 executes a program recorded in the storage device 101, to perform the process shown in FIG. 14.

The control device 100 controls the light quantities of the laser diodes 130Y, 130M, 130C, and 130BK to differ from one another, so that test images Pt are formed on a paper sheet P (step S1). In the description below, a laser diode will be also referred to as "LD" where appropriate.

In the first example operation, a test image Pt(1) is formed with a first light quantity (LD1), and a test image Pt(2) is formed with a second light quantity (LD2) that is smaller than the first light quantity (LD1). Likewise, a test image Pt(3) is formed with a third light quantity (LD3) that is smaller than the second light quantity (LD2), and a test image Pt(4) is formed with a fourth light quantity (LD4) that is smaller than the third light quantity (LD3).

The control device 100 controls the sheet conveying unit 20 to convey the paper sheet P having the test images Pt(1) to Pt(4) formed and fixed thereon as shown in FIG. 13, to the detector 2B. The detector 2B then reads the respective test images, and acquires the image data D (profile data) of the respective test images as shown in FIG. 9 (step S2). As the detector 2B reads the test images Pt(1) to Pt(4) via the separating unit 7, the number of sets of image data D to be obtained by the detector 2B is equal to "the number of the test images×the number of light portions separated by the separating unit 7".

The control device 100 first obtains the image data D of the test image Pt(1), and calculates a line width and an edge blur. Specifically, the control device 100 calculates a line width detection threshold Th1 for each set of image data D obtained through the filters of the respective colors in the separating unit 7, and calculates the two intersection points P1 and P2 between the image data D and the line width detection threshold Th1, as shown in FIG. 4A. The control device 100 then multiplies the conveyance velocity of the paper sheet P by the time required for conveyance from the intersection point P1 to the intersection point P2, to determine the line width of the test image Pt(1) with respect to each of the filters of the respective colors in the separating unit 7.

The control device 100 also calculates a lower limit threshold Th2 and an upper limit threshold Th3 for each set of image data D obtained through the filters of the respective colors in the separating unit 7. The control device 100 then calculates the intersection point P3 between the image data D and the lower limit threshold Th2, and the intersection point P4 between the image data D and the upper limit threshold Th3 at the rising edge E1, as shown in FIG. 4B. The control device 100 multiplies the conveyance velocity of the paper sheet P by the time required for conveyance from the intersection point P3 to the intersection point P4. In this manner, the control device 100 determines the distance d2 corresponding to the edge blur at the rising edge E1 for each of the filters of the respective colors in the separating unit 7.

The control device 100 further calculates an intersection point P5 between the image data D and the upper limit threshold Th3, and an intersection point P6 between the image data D and the lower limit threshold Th2 at the falling edge E2. The control device 100 then multiplies the conveyance velocity of the paper sheet P by the time required for conveyance from the intersection point P5 to the intersection point P6. In this manner, the control device 100 determines the distance d3 corresponding to the edge blur at the falling edge E2 for each of the filters of the respective colors in the separating unit 7. In this example, the mean value d4 between the distance d2 and the distance d3 is regarded as the value of the edge blur in the image data D of each of the filters of the respective colors in the separating unit 7 (step S3).

The control device 100 compares the edge blurs of the image data D obtained through the filters of the respective colors in the separating unit 7, and sets the value of the line width of the image data obtained through the filter having the smallest edge blur as the value of the actual line width t1 of the test image Pt(1) (step S4).

Determining the line widths of the respective test images Pt formed with different laser diode light quantities, the control device 100 recognizes the laser diode light quantities necessary for forming images with predetermined respective line widths, and obtains characteristics information about the laser diode light quantities and the line widths.

The control device 100 then sets such a laser diode light quantity as to obtain the target line width based on the characteristics information about the laser diode light quantities and the line widths (step S5).

The control device 100 then determines whether the line width calculation and the setting of a laser diode light quantity have been completed for all the test images Pt(1) to Pt(4) (step S6). If there still remains a test image to be measured, the control device 100 moves on to step S2. Since there remain the test images Pt(2) to Pt(4) in this example, the control device 100 obtains the image data D of the test image Pt(2) through the filters of the respective colors in the separating unit 7. The control device 100 then calculates the line widths of the respective sets of image data D and sets light quantities for the laser diodes. If there remain no test images to be measured, on the other hand, the first example operation comes to an end.

In the flowchart shown in FIG. 14, the line widths of test images are sequentially calculated, and laser diode light quantities are sequentially set. However, the laser diode light quantities corresponding to the respective line widths of all the test images may be set after the line widths of all the test image are calculated. Although the four laser diode light quantities are set in this example as described above, any number of laser diode light quantities, except for one, may be set.

In the image forming apparatus 10A, if the line widths of test images Pt are not accurately determined, appropriate light quantities not set for the laser diodes. As a result, the lines become thicker or thinner at the time of image formation, and the image might become unclear, resulting poorer image quality.

In the first embodiment described above, on the other hand, the edge blurs at the rising edge and the falling edge of each set of image data of light at different wavelengths obtained by the detector 2B reading test images Pt formed on a paper sheet Pare calculated, and the widths of the test images Pt are also calculated. The widths calculated from the sets of image data having the smallest edge blurs are determined to be the widths of the test images Pt.

Consequently, the line width of each test image Pt (the length of each image in the sub scan direction) can be accurately determined, even if the optical length between the paper sheet P and the detector 2B changes. Also, as the line width of each test image Pt can be accurately determined, the laser diode light quantities necessary for forming images with predetermined line widths can be recognized. Thus, appropriate laser diode light quantities can be set, and image formation quality stabilizes.

3. Second Embodiment

Referring now to FIGS. 15 to 18, a second embodiment of the present invention is described.

This embodiment is an example where a black line (a black test image) for measuring the distance between a paper sheet and a detector, and a color line (a color test image) having a line width to be measured are drawn as a set of test images on a paper sheet.

Figures 15, 16, 17:
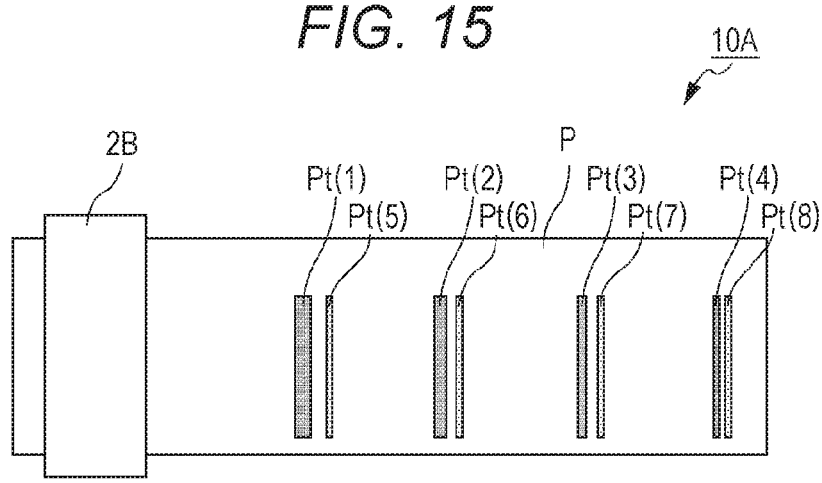
FIG. 15 is an explanatory diagram showing an example of test images according to a second embodiment of the present invention.
FIG. 16 is a table showing the results of measurement of focal length differences with respect to color filters.
FIG. 17 is a table for explaining an example of the correspondence relationship between focus shifts and coefficient values according to a second embodiment of the present invention.

FIG. 15 is an explanatory diagram showing an example of test images according to the second embodiment of the present invention.

In FIG. 15, a color-line test image Pt(5) is formed as a test image on the upstream side of a black-line test image Pt(1) in the sheet conveyance direction. Likewise, a color-line test image Pt(6) is formed on the upstream side of a test image Pt(2) in the sheet conveyance direction, a color-line test image Pt(7) is formed on the upstream side of a test image Pt(3) in the sheet conveyance direction, and a color-line test image Pt(8) is formed on the upstream side of a test image Pt(4) in the sheet conveyance direction. The line widths of the color-line test images Pt(5) to Pt(8) become thinner in the order of the color-line test images Pt(5) to Pt(8). Although the black-line test images Pt(1) to Pt(4) have different line widths in FIG. 15, the line widths of the black-line test images Pt(1) to Pt(4) may be the same, being used for measuring the distance between a paper sheet and a detector. Alternatively, only one black-line test image may be formed.

Next, an outline of image inspection using a detector 2B according to this embodiment is described, with reference to FIGS. 15 and 16.

In this embodiment, image data D of respective colors of a black-line test image is obtained through filters of the respective colors in a separating unit 7. The edge blurs of the respective sets of image data D are calculated in the same manner as in step S3 of FIG. 14, and the focal length of the sensor system (a filter of the separating unit 7 and the light receiving element 8) formed with the filter through which the image data D having the smallest edge blur has been obtained is determined (this filter will be referred to as the first filter). The focal length of the sensor system formed with a filter (a second filter) of a color complementary to the color line to be measured is obtained. A difference between the focal length with the first filter through which the image data D having the smallest edge blur has been obtained, and the focal length with the second filter of the color complementary to the color line to be measured is calculated (focal length difference=focus shift).

The image data D of a color-line test image is then obtained through the second filter in the same manner as in step S3 of FIG. 14. The line width and the edge blur of this image data D are then measured in the same manner as in step S3 of FIG. 14.

Lastly, the true line width of the test image is calculated according to a predetermined arithmetic expression involving the line width, the edge blur, and the focus shift of the test image obtained with the filter (second filter) of the color complementary to the color line to be measured.

The following is a description of an example case where (1) the color line to be measured is in yellow (Y), and (2) the edge blur of the black line (BK) is the smallest with a filter E shown in FIG. 16. FIG. 16 is a table showing the results of measurement of focal length differences with respect to color filters. The table in FIG. 16 shows the types of the respective filters, the transmission wavelengths, the focal length differences, and the colors to be measured.

Since the color line to be measured is in yellow (Y), a filter B shown in FIG. 16 is used. The color to be measured and the color of the filter B are in a complementary relationship.

The length of a focus shift is determined from the difference between the focal length with the filter B shown in FIG. 16 and the focal length with the filter E. In FIG. 16, however, the focal length with a filter D is set as the reference, and the differences (focal length differences) between the focal length with the filter D and the focal lengths at the filters A to C, E, and F. In view of this, the difference (focal length difference) between the focal length with the filter B and the focal length with the filter E is determined to be 0.5−(−0.8) =1.3 mm. That is, the focus shift between the filter B and the filter E is 1.3 mm.

The line width of the color line to be measured is determined according to the equation (1) shown below, from the focus shift of 1.3 mm and the line width and the edge blur measured through the filter B.

Target line width=calculated line width+α×|focus shift| (1)

α: a coefficient determined from a focus shift

FIG. 17 is a table showing an example of the correspondence relationship between focus shifts and coefficients.

The correspondence relationship between focus shifts and coefficients shown in FIG. 17 is stored beforehand in the ROM of the control device 100 or in the storage device 101.

(Second Example Operation of the Image Forming Apparatus)

Figure 18:
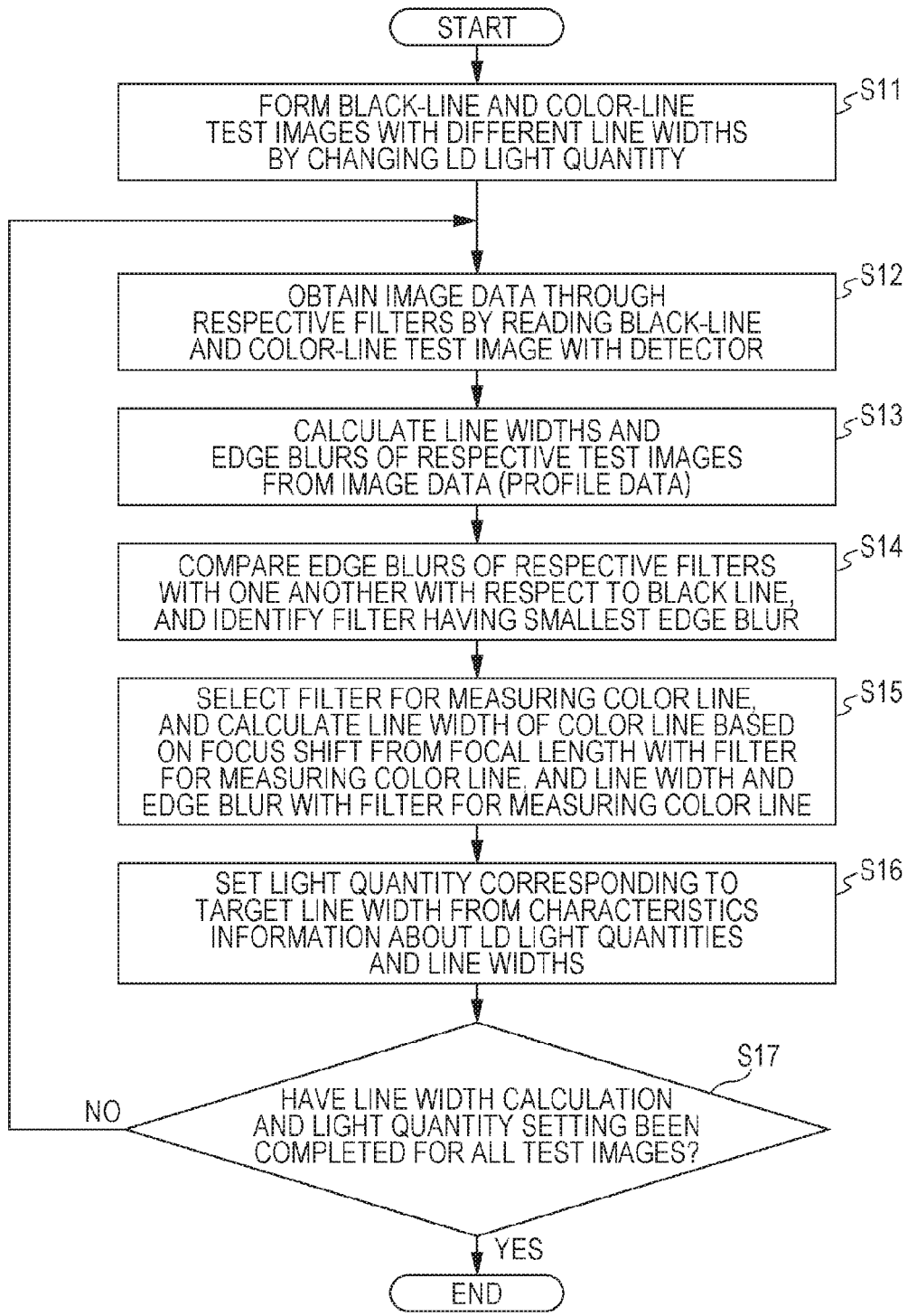
FIG. 18 is a flowchart showing the sequence of the procedures in an example operation of an image forming apparatus according to the second embodiment of the present invention.

FIG. 18 is a flowchart showing the sequence of the procedures in a second example operation of the image forming apparatus 10A.

The control device 100 controls the light quantities of the laser diodes 130Y, 130M, 130C, and 130BK to differ from one another, so that test images Pt are formed on a paper sheet P (step S11). In this case, the black-line test images Pt(1) to Pt(4) and the color-line test images Pt(5) to Pt(8) shown in FIG. 15 are formed.

The control device 100 controls the sheet conveying unit 20 to convey the paper sheet P having the test images Pt(1) to Pt(8) formed and fixed thereon as shown in FIG. 15, to the detector 2B. The detector 2B then reads the respective test images, and acquires the image data D (profile data) of the respective test images as shown in FIG. 9 (step S12).

The control device 100 obtains the image data D of the black test image Pt(1) and the color-line test image Pt(5) through the filters of the respective colors in the separating unit 7, and calculates the line widths and the edge blurs in the respective sets of image data D in the same manner as in steps S3 and S4 of FIG. 14 (step S13).

The control device 100 then compares the edge blurs of the respective sets of image data D of the black test image Pt(1), and identifies the filter (first filter) having the smallest edge blur (step S14).

The control device 100 then obtains the focal length with the filter (first filter) having the smallest edge blur in the sets of image data D of the black test image Pt(1). The control device 100 obtains the focal length with the filter (second filter) of the color complementary to the color-line test image Pt(5), and calculates the difference between the focal length with the first filter and the focal length with the second filter of the color complementary to the color line (focal length difference=focus shift). The control device 100 then calculates the true line width of the color-line test image Pt(5) according to the above equation (1) involving the focus shift and the line width and the edge blur of the test image Pt(5) obtained through the filter (second filter) complementary to the color line (step S15).

The control device 100 then sets such a laser diode light quantity that the test image Pt(5) has a target line width based on the characteristics information about the laser diode light quantities and the line widths (step S16).

The control device 100 then determines whether the line width calculation and the setting of a laser diode light quantity have been completed for all the color-line test images Pt(5) to Pt(8) (step S17). If there remains at least one color-line test image to be measured, the control device 100 moves onto step S12. If there remain no color-line test images to be measured, the second example operation comes to an end.

In the second embodiment designed as described above, a focal length difference (a focus shift) is determined. A focal length difference is the difference between the focal length of the optical lens 6 with respect to light at the wavelength corresponding to the image data having the smallest edge blur in a black test image and the focal length of the optical lens 6 with respect to the light at the wavelength corresponding to the color complementary to a color-line test image. The calculated width of the color-line test image is corrected with the edge blur and the focus shift.

Consequently, the line width of each color-line test image (the length of each image in the sub scan direction) can be accurately determined, even if the optical length between the paper sheet P and the detector 2B changes. Also, as the line width of each color-line test image can be accurately determined, the laser diode light quantities necessary for forming color images with predetermined line widths can be recognized. Thus, appropriate laser diode light quantities can be set, and image formation quality stabilizes.

4. Third Embodiment

Figure 19:
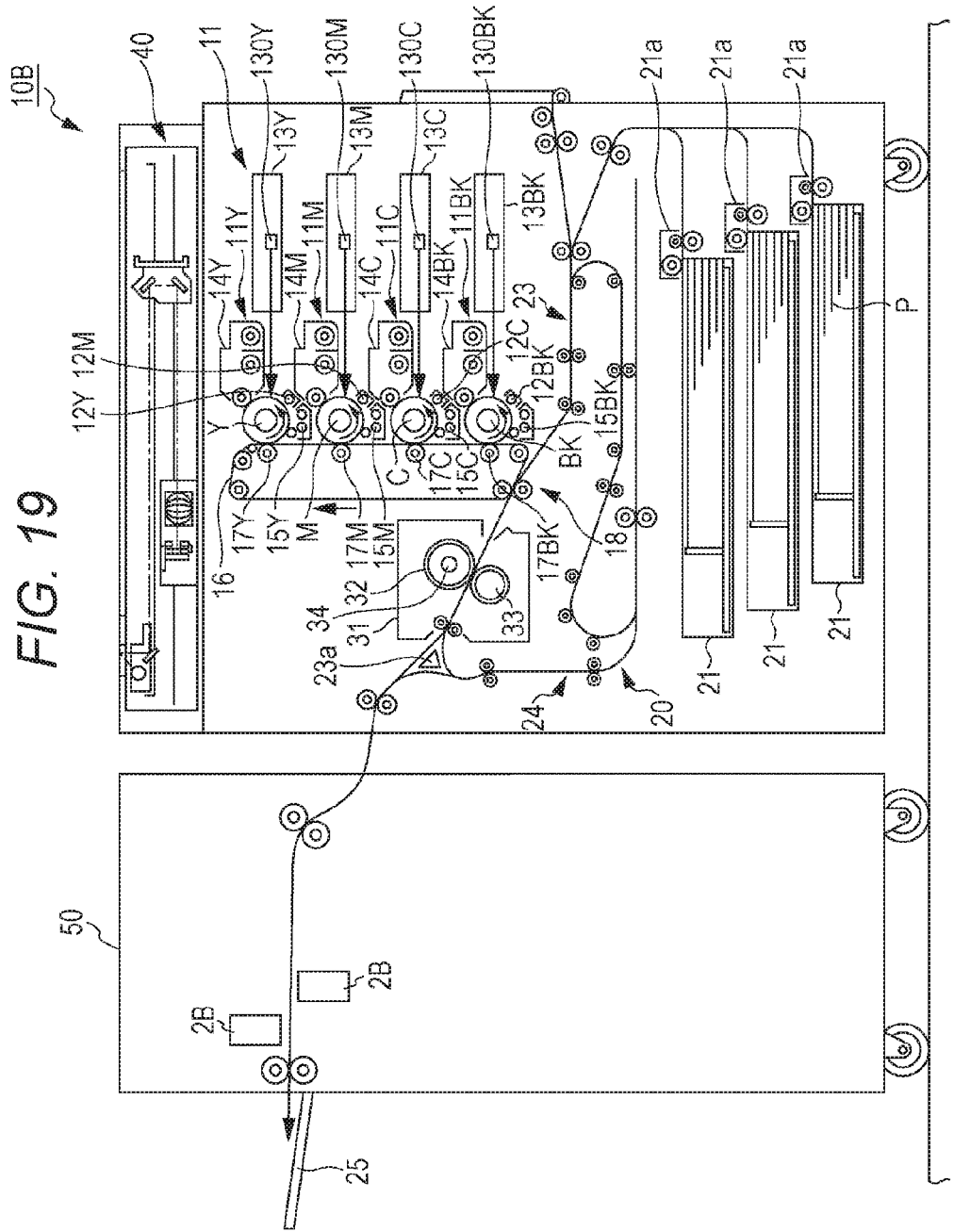
FIG. 19 is a diagram showing an example entire structure of an image forming apparatus according to a third embodiment of the present invention.

FIG. 19 is a diagram showing the entire structure of an example of an image forming apparatus according to a third embodiment of the present invention.

The image forming system shown in FIG. 19 includes an image forming apparatus 10B and a post-processing apparatus 50. The image forming apparatus 10B does not include any detector 2B, but the post-processing apparatus 50 includes two detectors 2B. The two detectors 2B are provided on and under the conveyance path in the post-processing apparatus 50, and face each other, with the conveyance path being interposed in between. As the detectors 2B are provided on and under the conveyance path, the widths of images formed on the surfaces of a paper sheet can be measured at the same time. In this structure, a paper sheet is pressed by conveyance rollers provided on the upstream side and the downstream side of the detectors 2B in the sheet conveyance direction. As a result, the sheet conveyance position might become unstable (see FIG. 1B). In such a case, the above described structure of the present invention proves effective.

5. Fourth Embodiment

Figure 20:
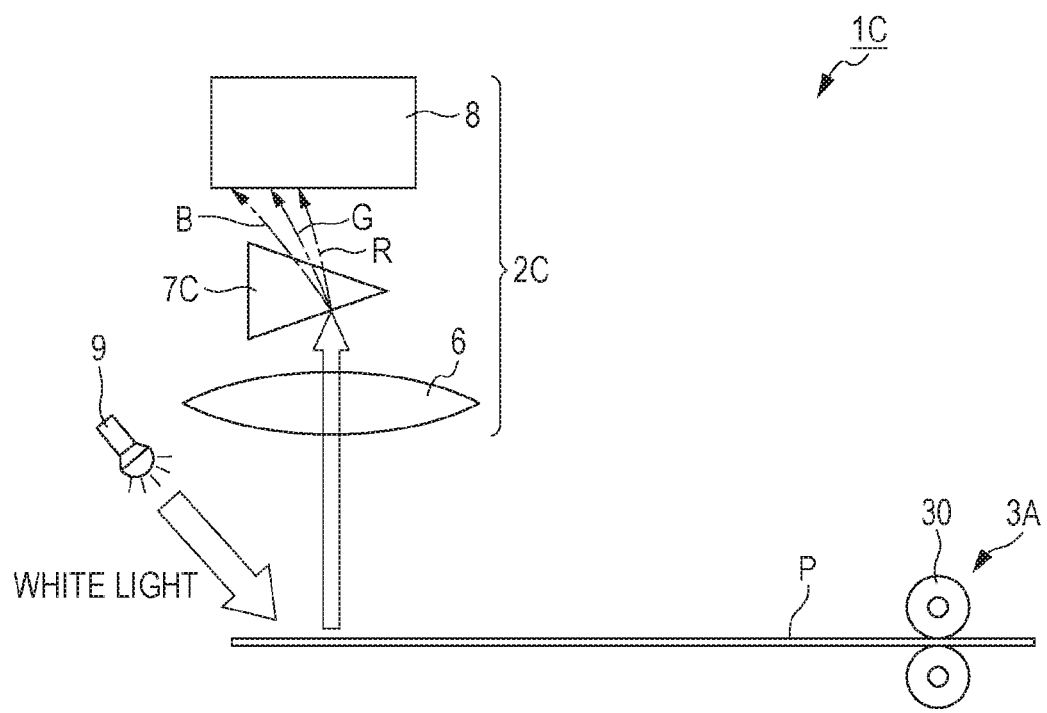
FIG. 20 is a diagram showing an example structure of an image inspection apparatus according to a fourth embodiment of the present invention.

FIG. 20 is a diagram showing an example structure of an image inspection apparatus according to a fourth embodiment of the present invention.

The image inspection apparatus 1C shown in FIG. 20 includes a detector 2C that uses a prism as a separating unit 7C. Light that is emitted from a light emitting element 9 onto a paper sheet P is reflected by the paper sheet P, and then enters the separating unit 7C. Since the separating unit 7C is a prism, light separated (divided) in accordance with wavelengths exits from the exit side. The light at the different wavelengths is received by a light receiving element 8. The light at the different wavelengths enters photoelectric conversion elements for the respective wavelengths among the photoelectric conversion elements provided in the light receiving element 8.

In a case where a spectral element such as a prism is used as the separating unit as described above, light that has passed through the optical lens 6 can be separated in accordance with wavelength bands, as in a case where color filters are used. However, the separating unit 7 formed with color filters is thinner, and accordingly, the detector including the separating unit 7 can be smaller.

6. Fifth Embodiment

Figure 21A:
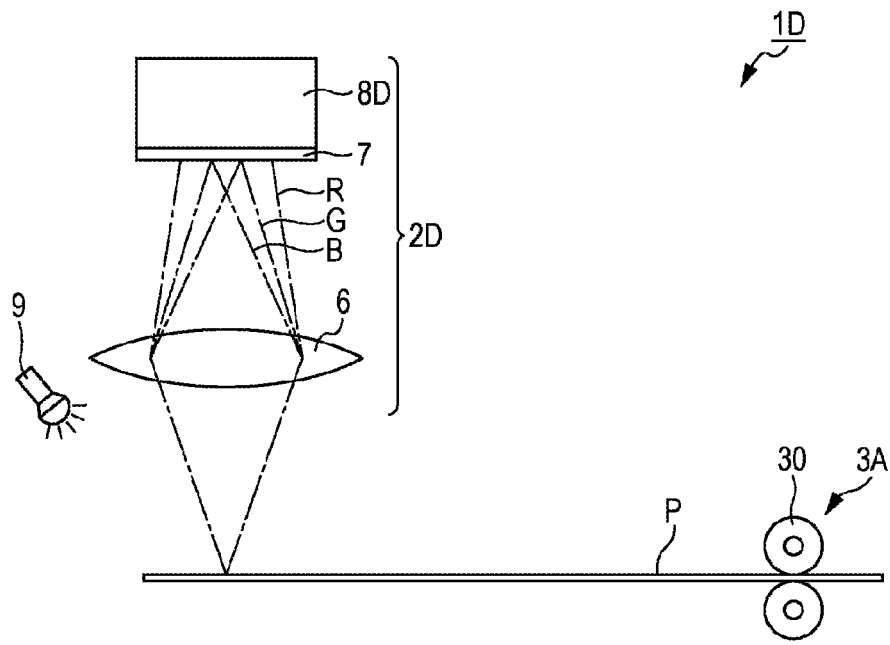
FIGS. 21A and 21B are diagrams showing an example structure of an image inspection apparatus according to a fifth embodiment of the present invention.
Figure 21B:
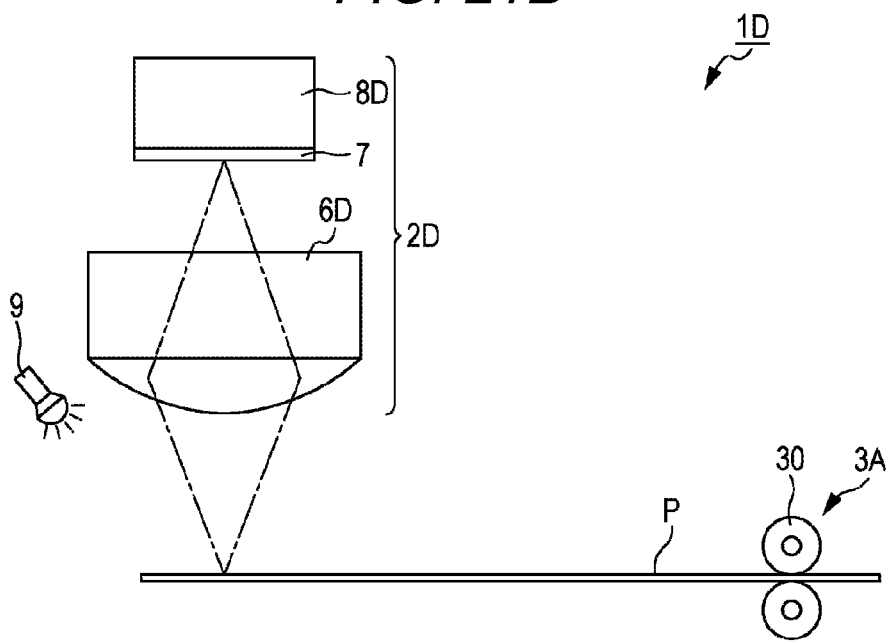

FIGS. 21A and 21B are diagrams showing an example structure of an image inspection apparatus according to a fifth embodiment of the present invention.

Use of a general-purpose CCD or CMOS image sensor in a detector that detects line widths of images is an easy mode to carry out the present invention. When a normal image is read with an image sensor in a structure including the above described optical lens 6, however, image blurring occurs due to the chromatic aberration among R, G, and B in the optical lens 6. This problem can be solved by changing the structure of the optical lens system between a time of line width detection and a time of image reading.

The image inspection apparatus 1D shown in FIG. 21 includes a detector 2D that uses a CCD image sensor as a separating unit 7D, for example. The image inspection apparatus 1D uses the optical lens 6 at a time of line width detection, and replaces the optical lens 6 with an optical lens 6D having smaller axial chromatic aberration at a time of normal image reading. Alternatively, optical lens systems may not be switched, but part of an optical lens system is changed to obtain different optical characteristics.

According to this embodiment designed as described above, a single detector can be used for two different purposes. Also, even if there remains some axial chromatic aberration, image blurring can be prevented by performing correction for each color when an R image, a G image, and a B image are combined in the image sensor. In this manner, the combined image can be read as a normal image.

Embodiments to which the invention made by the inventor is applied have been described so far. However, the present invention is not limited by the description and the drawings of the embodiments forming part of the disclosure of the invention, and various changes and modifications may be made to them without departing from the scope of the claimed invention.

Although test images are formed on paper in each of the above embodiments, test images may be formed on a paper-like medium made of resin or the like, or may be formed on a thick medium, instead of a thin medium like paper. If there are irregularities on the surface of a medium, the distance between the detector and the medium changes, and accurate line widths may not be determined. To counter this problem, the above described present invention is used in determining correct line widths.

In the above described embodiments, the present invention is applied to image forming apparatuses that form color images. However, the present invention may also be applied to image forming apparatuses that form monochrome images.

According to an embodiment of the present invention, a wrong line width is not obtained, and a correct line width value can be calculated even in a case where the distance from the paper sheet to the reading unit changes.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An image inspection apparatus comprising:
a light source configured to emit white light onto a test image formed on a paper sheet;
an optical lens system configured to receive light reflected by the paper sheet, the reflected light being of the white light emitted from the light source;
a separator configured to separate light having passed through the optical lens system in accordance with wavelength bands;

a sensor configured to receive the separated light at the different wavelengths, and optically read the test image of the light at each of the different wavelengths; and a hardware processor configured to calculate edge blurs at a rising edge and a falling edge of each set of image data of the light at the different wavelengths obtained by the sensor reading the test image, calculate widths of the test image, determine the width calculated from the set of image data having the smallest edge blur to be the width of the test image, and set a laser diode light quantity, for forming an image, using the test image having the smallest edge blur.

2. The image inspection apparatus according to claim 1, wherein the test image is a black image.

3. The image inspection apparatus according to claim 1, wherein the separator is a color filter capable of separating a plurality of colors from one another, the color filter being provided in front of the sensor.

4. An image inspection apparatus comprising:

a light source configured to emit white light onto a black test image and a color test image formed on a paper sheet;

an optical lens system configured to receive light reflected by the paper sheet, the reflected light being of the white light emitted from the light source;

a separator configured to separate light having passed through the optical lens system in accordance with wavelength bands;

a sensor configured to receive the separated light at the different wavelengths, and optically read the test images of the light at each of the different wavelengths; and a hardware processor configured to calculate edge blurs at a rising edge and a falling edge of each set of image data of the light at the different wavelengths obtained by the sensor reading the black test image, calculate edge blurs at a rising edge and a falling edge of each set of image data of the light at the different wavelengths obtained by the sensor reading the color test image, and calculate widths of the test images, wherein the hardware processor determines a focal length difference between a focal length of the optical lens system with respect to light at a wavelength corresponding to the image data having the smallest edge blur in the black test image and a focal length of the optical lens system with respect to light at a wavelength corresponding to a color complementary to the color test image, correct the calculated widths of the test images by using the edge blurs and the focal length difference, and set a laser diode light quantity, for forming an image, using the test image having the focal length difference.

5. The image inspection apparatus according to claim 4, wherein the hardware processor obtains target widths by applying the calculated widths of the test images, the edge blurs, and the focal length difference to the following equation:

target width=calculated width+α×|focal length difference|

α: a coefficient determined by the focal length difference.

6. The image inspection apparatus according to claim 4, wherein the separator is a color filter capable of separating a plurality of colors from one another, the color filter being provided in front of the sensor.

7. An image forming apparatus comprising:

an image forming unit configured to form an image on a paper sheet;

a light source configured to emit white light onto a test image formed on the paper sheet;

an optical lens system configured to receive light reflected by the paper sheet, the reflected light being of the white light emitted from the light source;

a separator configured to separate light having passed through the optical lens system in accordance with wavelength bands;

a sensor configured to receive the separated light at the different wavelengths, and optically read the test image of the light at each of the different wavelengths; and a hardware processor configured to calculate edge blurs at a rising edge and a falling edge of each set of image data of the light at the different wavelengths obtained by the sensor reading the test image, calculate widths of the test image, determine the width calculated from the set of image data having the smallest edge blur to be the width of the test image, and set a laser diode light quantity, for forming the image on a paper sheet, using the test image having the smallest edge blur.

8. An image forming apparatus comprising:

an image forming unit configured to form an image on a paper sheet;

a light source configured to emit white light onto a black test image and a color test image formed on the paper sheet;

an optical lens system configured to receive light reflected by the paper sheet, the reflected light being of the white light emitted from the light source;

a separator configured to separate light having passed through the optical lens system in accordance with wavelength bands;

a sensor configured to receive the separated light at the different wavelengths, and optically read the test images of the light at each of the different wavelengths; and a hardware processor configured to calculate edge blurs at a rising edge and a falling edge of each set of image data of the light at the different wavelengths obtained by the sensor reading the black test image, calculate edge blurs at a rising edge and a falling edge of each set of image data of the light at the different wavelengths obtained by the sensor reading the color test image, and calculate widths of the test images, wherein the hardware processor determines a focal length difference between a focal length of the optical lens system with respect to light at a wavelength corresponding to the image data having the smallest edge blur in the black test image and a focal length of the optical lens system with respect to light at a wavelength corresponding to a color complementary to the color test image, correct the calculated widths of the test images by using the edge blurs and the focal length difference, and set a laser diode light quantity, for forming the image on a paper sheet, using the test image having the focal length difference.

* * * * *